United States Patent
Gonsa et al.

(10) Patent No.: US 12,031,839 B2
(45) Date of Patent: Jul. 9, 2024

(54) SYSTEM FOR PRODUCING AND/OR UPDATING A DIGITAL MODEL OF A DIGITAL MAP

(71) Applicant: Continental Automotive GmbH, Hannover (DE)

(72) Inventors: Osvaldo Gonsa, Bad Homburg (DE); Rene Alexander Körner, Munich (DE)

(73) Assignee: Continental Automotive GmbH, Hannover (DE)

( * ) Notice: Subject to any disclaimer, the term of this patent is extended or adjusted under 35 U.S.C. 154(b) by 633 days.

(21) Appl. No.: 16/651,657

(22) PCT Filed: Sep. 26, 2018

(86) PCT No.: PCT/EP2018/076148
§ 371 (c)(1),
(2) Date: Mar. 27, 2020

(87) PCT Pub. No.: WO2019/063628
PCT Pub. Date: Apr. 4, 2019

(65) Prior Publication Data
US 2020/0309538 A1 Oct. 1, 2020

(30) Foreign Application Priority Data

Sep. 28, 2017 (DE) ................ 10 2017 217 297.5

(51) Int. Cl.
*G01C 21/00* (2006.01)
*G06F 16/29* (2019.01)

(52) U.S. Cl.
CPC ..... *G01C 21/3859* (2020.08); *G01C 21/3889* (2020.08); *G06F 16/29* (2019.01)

(58) Field of Classification Search
CPC ...... G01C 21/32; G06F 16/29; G08G 1/0129; G08G 1/0112; G08G 1/0141
See application file for complete search history.

(56) References Cited

U.S. PATENT DOCUMENTS 8,189,778 B2   5/2012   Zhang
10,223,380 B2  3/2019   Giurgiu
(Continued)

FOREIGN PATENT DOCUMENTS

CN   1474933 A    2/2004
CN   101438334 A  5/2009
(Continued)

OTHER PUBLICATIONS

DE-102013205392-A1 English Translation.*
(Continued)

*Primary Examiner* — Rami Khatib
*Assistant Examiner* — Gabriel Joseph Rene Lambert

(57) ABSTRACT

A system for generating and/or updating a digital model of at least one sub-region of a digital map includes on the vehicle-side: a vehicle database with vehicle-side map data which image at least one sub-region of the digital map, one or more sensors for capturing vehicle surroundings data; one or more processors, which are configured to generate at least one snippet from the vehicle surroundings data; and from the snippet to determine updating data of the sub-region of the digital map if an event occurs in the form of a difference between objects in the map data and objects in the snippet; and the system having on the backend side a server database with backend-side map data of the digital model; and one or more processors, which are configured to statistically evaluate the updating data and to perform an update of the backend-side map data depending on the statistical evaluation.

10 Claims, 3 Drawing Sheets

(56) References Cited

U.S. PATENT DOCUMENTS

| | | |
|---|---|---|
| 11,073,402 B2 | 7/2021 | Stahlin |
| 2003/0004637 A1 | 1/2003 | Adachi |
| 2008/0262721 A1 | 10/2008 | Guo et al. |
| 2008/0303693 A1 | 12/2008 | Link, II |
| 2009/0070031 A1 | 3/2009 | Ginsberg |
| 2011/0125401 A1 | 5/2011 | Staehlin |
| 2011/0137546 A1 | 6/2011 | Roesser et al. |
| 2013/0158821 A1 | 6/2013 | Ricci |
| 2015/0058305 A1* | 2/2015 | Scharmann ............ G06F 16/219 707/695 |
| 2015/0127249 A1 | 5/2015 | Straußet al. |
| 2016/0259814 A1* | 9/2016 | Mizoguchi .............. G06F 16/29 |
| 2017/0277716 A1* | 9/2017 | Giurgiu ................... G06F 16/29 |
| 2018/0252536 A1* | 9/2018 | Dorum ............... G01C 21/3673 |
| 2018/0252538 A1 | 9/2018 | Staehlin |
| 2018/0322782 A1 | 11/2018 | Engel et al. |
| 2020/0250207 A1* | 8/2020 | Li ........................ G09B 29/003 |

FOREIGN PATENT DOCUMENTS

| | | | |
|---|---|---|---|
| CN | 102667409 A | | 9/2012 |
| CN | 104471625 A | | 3/2015 |
| CN | 105937912 A | | 9/2016 |
| DE | 19513640 A1 | | 6/1996 |
| DE | 10030932 A1 | | 1/2002 |
| DE | 69823462 T2 | | 4/2005 |
| DE | 102008012661 A1 | | 2/2009 |
| DE | 102013205392 A1 * | 10/2014 | ............ G01C 21/32 |
| DE | 102013205392 A1 | | 10/2014 |
| DE | 102014217847 A1 | | 3/2016 |
| DE | 102016205543 A1 | | 5/2017 |
| EP | 3222973 A2 | | 9/2017 |
| JP | 2016502133 A | | 1/2016 |
| JP | 2016058044 A | | 4/2016 |
| JP | 2016156973 A | | 9/2016 |
| JP | 2016156973 A * | 9/2016 | ............. G01C 21/26 |
| JP | 2016161456 A | | 9/2016 |
| JP | 2018534692 A | | 11/2018 |
| WO | 2010091112 A2 | | 8/2010 |

OTHER PUBLICATIONS

JP-2016156973-A English Translation.*
International Search Report and Written Opinion dated Dec. 19, 2018 from corresponding International Patent Application No. PCT/EP2018/076148.
Search Report dated Jul. 21, 2021 from related Chinese patent application No. 201880063109.6.
Office Action dated Jul. 27, 2021 from related Chinese patent application No. 201880063109.6.
Office Action dated Jul. 27, 2021 from related Chinese patent application No. 201880063109.6 (Translated).
Decision to Grant dated Jul. 14, 2021 from related Japanese application No. 2020-517120.
Decision to Grant dated Jul. 14, 2021 from related Japanese application No. 2020-517120 (Translated).
Non-Final Office Action dated Mar. 28, 2022 from related U.S. Appl. No. 16/651,712.
Notice of Allowance dated Oct. 25, 2022 from related U.S. Appl. No. 16/651,712.
Office Action dated Aug. 22, 2018 from related German patent application No. 10 2017 217 299.1.
International Search Report and Written Opinion dated Jan. 18, 2019 from related International patent application No. PCT/EP2018/076151.
Written Decision on Registration dated Mar. 24, 2022 from related Korean patent application No. 10-2020-7012102.
Written Decision on Registration dated Mar. 24, 2022 from related Korean patent application No. 10-2020-7012102 (Translated).
Guiyan Jiang, Longhui Gang and Zhili Cai, "Impact of Probe Vehicles Sample Size on link Travel Time Estimation," 2006 IEEE Intelligent Transportation Systems Conference, 2006, pp. 505-509, doi: 10.1109/ITSC.2006.1706791.

* cited by examiner

SYSTEM FOR PRODUCING AND/OR UPDATING A DIGITAL MODEL OF A DIGITAL MAP

TECHNICAL FIELD

The invention relates to the field of driving assistance systems. The present invention relates in particular to the capture of route data by sensors of a vehicle and transmission of the captured route data to a vehicle-external database.

TECHNICAL BACKGROUND

In order to keep data pertaining to route properties in a database of a backend device, for example for autonomous or semiautonomous driving, relevant, the data need to be regularly brought up to date. Capture of the route properties can be performed by vehicles traveling on the roads that are each equipped with suitable sensors and an apparatus for capturing the geo-position. The captured data can then be sent via a vehicle-to-X communication or a mobile radio connection to a database of the backend device, where they are consolidated to produce a data record that can then be sent to other vehicles, e.g. for a route calculation or the like. The captured data can cause a very large data volume from the vehicles to the backend device when updating data from a plurality of vehicles are transmitted to the backend device. If the backend device already contains a statistically significant, updated and consolidated data record, then this represents a waste of communication resources, since a further increase in the quality of the consolidated data record cannot be achieved by further transfers of data captured by vehicles.

DISCLOSURE OF THE INVENTION

It is therefore the object of the invention to specify a system for generating or updating a digital model of a digital map, which operates reliably and safely.

This object is achieved by means of a system according to the independent system claims. The dependent claims relate to particular embodiments.

One aspect relates to a system for generating and/or updating a digital model of at least one sub-region of a digital map, wherein a bilateral data processing is performed. A portion of the data processing is carried out in one or more vehicles. Another portion of the data processing is carried out in a backend device. On the vehicle side the system has a vehicle database with vehicle-side map data, which image at least a sub-region of the digital map, which is also stored in a server database in the backend device. In addition, on the vehicle side, the system has one or more sensors for capturing data on the vehicle surroundings, and one or more processors which are configured to generate at least one snippet from the vehicle surroundings data. The snippet is a partial model of the digital map, which contains object data from objects in the vehicle's surroundings. It may be a CAD (computer-aided design) model of a, for example, 100 m×100 m large map section, which is computed from a sequence of camera images, for example. In addition, the one or more processors are configured to determine from the snippet updating data of the sub-region of the digital map, if an event occurs in the form of a difference between objects in the map data and objects in the snippet. The event can be, for example, a newly added object in the vehicle surroundings, such as a road blockage or a temporarily erected road sign. On the vehicle side, means of determining a spatial position of the event are also available, for example a GPS receiver for determining the position of the vehicle, or a radar sensor for additionally determining the spatial position of the event relative to the vehicle. On the vehicle side a transceiver is also provided, which is configured to receive a positive token or a negative token from a backend device and to forward said token to the vehicle database, and which is also configured to forward the updating data with the event and associated spatial position to the backend device when the vehicle-side database is in a default mode in relation to the spatial position of the event or when a positive token exists in the memory. If, on the other hand, a negative token is present, updating data are only transmitted to the backend device when the event has ceased. The default mode refers to a state of the vehicle-side database in which in relation to a defined spatial position of the vehicle, on the initial detection of an event by a vehicle, the latter transfers updating data to the vehicle database. In the default mode of the vehicle database the event is therefore not yet present in the backend.

In addition, the system comprises a backend device in the backend. This contains a server database with backend-side map data of the digital model, and a transceiver which is configured to receive the updating data from one or more vehicles. In addition, one or more processors are provided in the backend device, which are configured to statistically evaluate the updating data and to perform an update of the backend-side map data depending on the statistical evaluation and to generate a certain number of positive and negative tokens depending on the statistical evaluation. The number of positive tokens can be chosen so that the event is verified by a sufficiently high number of confirmations by other vehicles, so that only data with a correspondingly high confidence value is generated or updated in the server database. The transceiver of the backend device is also configured to forward the positive or negative tokens to one or more vehicles.

The digital model stored in the server database can comprise, in particular, a high-resolution digital map with additional surroundings elements. The digital map is formed at least by a road model, which describes the course of roads and driving lanes, and contains information about the number and course of lanes, curve radii, gradients, intersections, and similar characteristics.

The digital model may comprise, in particular, other static or dynamic surroundings elements. Static surroundings elements refer to information about the position and type of road and route markings, such as stop lines, zebra strips, median strips, lane markings and the like, the presence of roadside buildings, as well as their class and relative or absolute position, information about the position and type of traffic signs, or information about the type and condition of light signal systems or variable traffic signs. Dynamic surroundings elements relate in particular to the position and speed of vehicles. For each parameter, in particular, position and attribute, of a surroundings element, e.g. the position of the traffic sign and the type of the traffic sign, a statistic is defined from a statistically significant number of measurements during a training phase. This statistic can reflect the distribution of measured values around a mean value.

The updating data can be assigned a significance value in the backend device not only in relation to the number of measurements, i.e. transmissions by vehicles, but they can already be assigned a confidence value or a statistical parameter on the vehicle depending on their quality, for example the quality of the vehicle surroundings data. Thus, the quality of the vehicle surroundings data may be lower in bad weather conditions such as fog and heavy precipitation than in good weather conditions, in particular if the vehicle surroundings data consist of a sequence of camera images. The transceiver of each vehicle can be configured to forward the confidence value determined on the vehicle side or the statistical parameter to the backend device as additional data in addition to the updating data.

The backend device can also evaluate the updating data by statistical means alone. The one or more processors of the backend device can be configured to statistically evaluate the updating data based on the number of vehicles that have forwarded the updating data and/or on the number of transfers, and to assign a confidence value to the updating data based on the number of vehicles and/or the number of transfers.

The backend device can in this case incorporate the additional data determined on the vehicle side into the determination of the confidence value. The one or more processors of the backend device can evaluate the updating data based on the number of vehicles which have transmitted the updating data, and/or on the number of transfers, and on the basis of the additional data.

One aspect of the system concerns the generation of positive and negative tokens in the backend device. The one or more processors of the backend device can be configured to generate positive and negative tokens if the updating data have a statistical significance that exceeds a minimum threshold value, wherein the positive and negative tokens are assigned at least the spatial position of the relevant event and an event ID of the relevant event. The transceiver device of the backend device can be configured to forward the positive and negative tokens to one or more vehicles, in particular using a broadcast.

One aspect of the system relates to the treatment of the detection of the discontinuation of the event. The discontinuation of the event, to the extent that it can be evaluated as statistically significant, should ensure that all positive and negative tokens in all vehicles with respect to this event are deleted and that with respect to this event, i.e., in particular its spatial position, the vehicle database is transferred back into the default mode.

The one or more vehicle-side processors are configured to detect the discontinuation of the event with a certain spatial position and associated event ID if a negative difference exists between objects in the map data and objects in the snippet. The vehicle-side transceiver can be configured to communicate the discontinuation of the event to the backend device in the form of updating data if a negative token is present in the vehicle-side memory. This means that the discontinuation of the event is only reported by vehicles whose vehicle database has a negative token with respect to this event.

The one or more processors of the backend device can be configured to generate a message to transfer the vehicle-side database into the default mode with respect to the spatial position and event ID of the event which has been discontinued, if the updating data have a statistical significance that exceeds a minimum threshold value. The transceiver of the backend device can be configured to forward the message to one or more vehicles. Thereupon, one or more vehicle-side processors can remove positive or negative tokens with respect to the spatial position and/or event ID from the vehicle-side memory and transfer the vehicle database back into the default mode with respect to the discontinued event.

One aspect relates to the spatial distribution of positive and negative tokens to the vehicles. The transceiver of the backend device can be configured to forward the positive or negative tokens to one or more vehicles, which are only located within the spatial proximity of the event.

One aspect relates to the distribution of the updated map data on the backend side to vehicles. For this purpose, the one or more backend-side processors can be configured to update the server database with backend-side map data of the digital model with the updating data, if this has a confidence value that exceeds a minimum threshold value. The backend-side transceiver can be configured to forward at least the data from the updated database which is related to the event to vehicles located in spatial proximity to the event.

BRIEF DESCRIPTION OF THE FIGURES

The invention will be described below on the basis of exemplary embodiments with reference to figures, in which.

DETAILED DESCRIPTION

Figure 1:
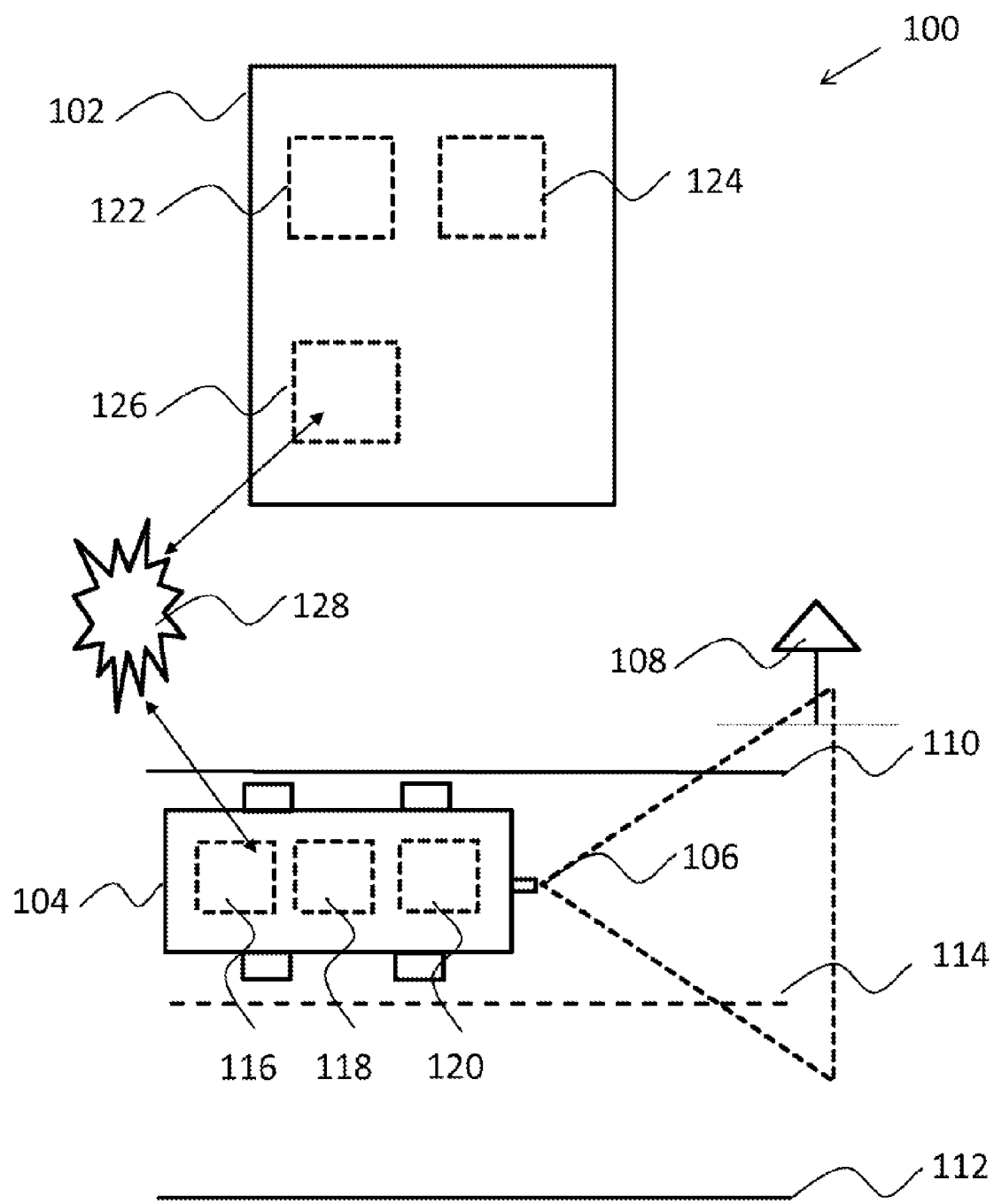
FIG. 1 shows a block circuit diagram of a system for producing a digital model.

FIG. 1 shows a system 100 for generating and/or updating a digital model of a digital map, the system consisting of a backend device 102 and a vehicle 104 having a sensor 106, which is moving on a road bounded by two lane markers 110, 112 with a median strip 114. The vehicle 104 has a transceiver device 116 for data transfer to or from the backend device 102. The backend device 102 also has a transceiver 126 for data transfer to and from the vehicle 104. The one surroundings sensor 106 mounted on the vehicle 104 can be designed as a camera, and to capture vehicle surroundings data in the form of a sequence of pictures from the vehicle surroundings which include the traffic sign 108. The surroundings sensor can additionally be designed as a radar sensor and configured to scan the surroundings by means of radar. In this way, the radar sensor 106 can additionally determine the position of a surroundings element, such as the traffic sign 108, relative to the spatial position of the vehicle. In conjunction with a GPS module (not shown) the absolute spatial position can also be determined. The vehicle additionally has a processor 120, which is configured to generate a snippet from the vehicle surroundings data. A snippet is an approximately 100×100 m large portion of the digital model and essentially represents an object modeling. The vehicle 104 also has a vehicle database 118 with vehicle-side map data, which image at least a sub-region of a digital map. The processor 120 is configured to compare the snippet with the corresponding vehicle-side map data from the vehicle database 118, to determine whether an event exists in the form of a difference between objects in the map data and the objects in the snippet. In this case, assume that the traffic sign 108 is not yet present in the map data, e.g. because it was only recently installed. The comparison therefore produces the newly installed traffic sign 108 as an event. This event is currently not known to the backend device, as it has not yet been communicated to the device via the communication network.

The vehicle 104 forwards the event in the form of updating data to the backend device 102, which can thereby update its server database 122 with server-side map data of the digital model. The digital model can be assembled from snippets that can originate from a plurality of vehicles. It can also be a parameterizable surroundings model. The parameterization can be performed in the course of a learning process by a statistically significant number of vehicles. The parameterized surroundings model therefore represents vehicle surroundings information consolidated in the backend. Each surroundings element of the surroundings element can have its own statistics in relation to position, attributes and detection probability. The backend device has a processor 124, which is configured to statistically evaluate the updating data and to perform an update of the backend-side map data in the server database 122 depending on the statistical evaluation.

It is assumed that the traffic sign 108 will be passed by a plurality of vehicles. Since each of these vehicles detects the newly installed traffic sign 108 as an event, this would generate a very large volume of data in the uplink to the backend device 102, if this event were communicated to the backend device 102 in the form of updated data by every vehicle. In the following therefore, a token-based protocol for the communication of the updating data is described with reference to FIGS. 2, 3 and 4.

Figure 2:
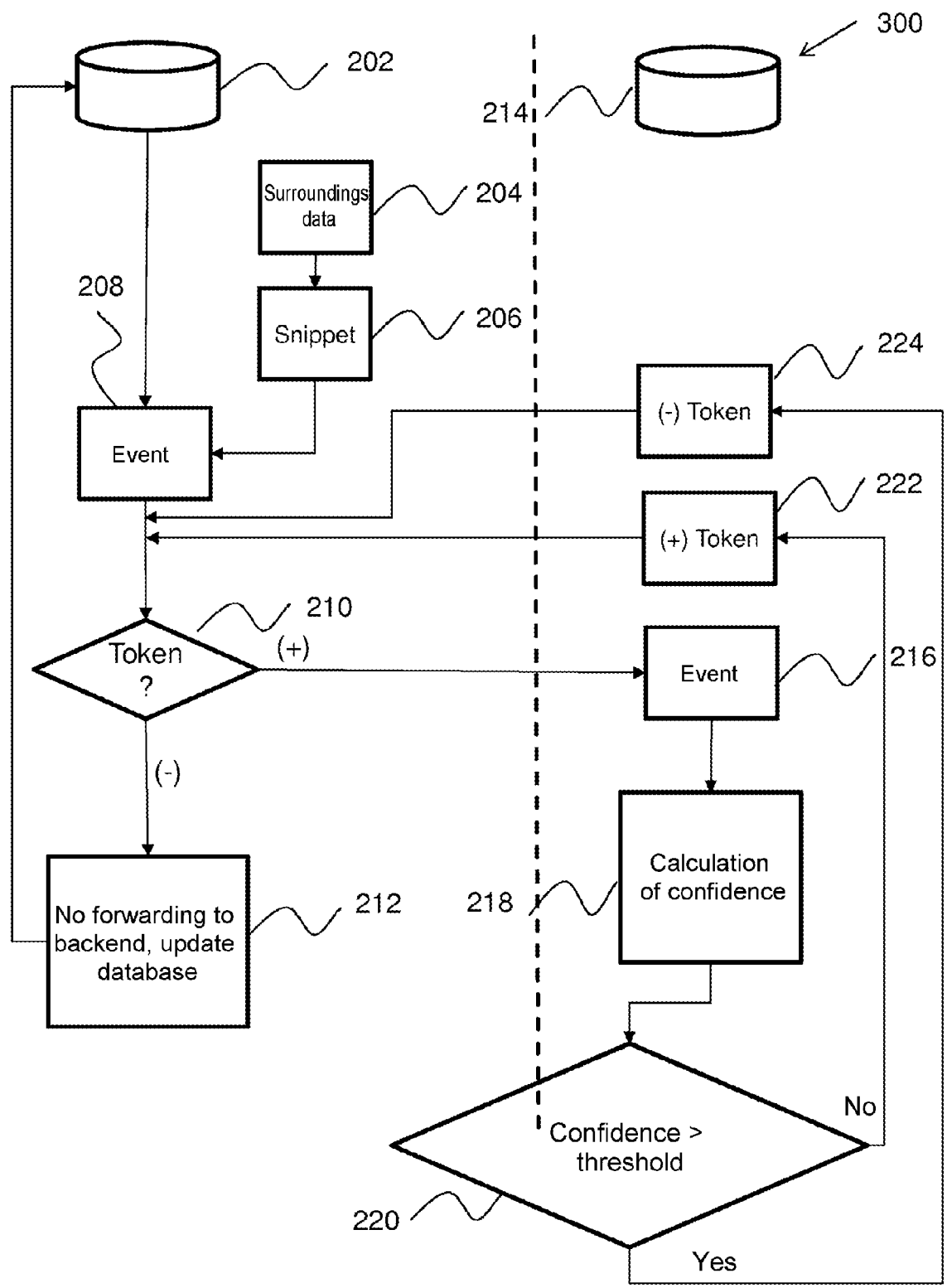
FIG. 2 a flow chart of the method for the occurrence of an event.

FIG. 2 shows a flow chart 200 of the protocol for the occurrence of an event. In the default mode, for a specific geographic area of the digital map there are no events present yet. The vehicle-side database 202 includes an excerpt from the entire digital map of the server-side database 200. The server-side database 200 contains a surroundings model, in particular a high-resolution digital map with further surroundings elements. The digital map is formed at least by a road model, which describes the course of roads and driving lanes, and contains information about the number and course of lanes, curve radii, gradients, intersections, and similar characteristics. The surroundings model may comprise, in particular, other static surroundings elements. Static surroundings elements refer to information about the position and type of road and route markings, such as stop lines, zebra strips, median strips, lane markings and the like, the presence of roadside buildings, as well as their class and relative or absolute position, information about the position and type of traffic signs, or information about the type and condition of light signal systems or variable traffic signs.

A vehicle-side sensor captures vehicle surroundings data, see step 204. From the vehicle surroundings data a snippet is calculated by one or more vehicle-side processors 206. The snippet contains the traffic sign 108, see FIG. 1, which was recently installed. By comparison, i.e. by calculating the difference between the objects in the vehicle-side database 202 and the snippet 206, the traffic sign 108 is identified as an event. In step 210 it is determined whether a positive token exists for this event, i.e. for the geographical region in which the event occurred. For geographical regions in which the vehicle-side database 202 is in the default mode, this is the case since the default mode is emulated by positive tokens. Since it is assumed that the event 208 does not yet exist in the server-side database 214, the vehicle-side database for the corresponding geographic area is in the default mode. In this case, the event 308 is forwarded to the backend device and after receipt exists there as event 216. On the backend side, the event is assigned a unique identification (ID), so that it can be identified. On the backend side a confidence value for the event is determined from the number of transfers of the event from possibly different vehicles, and on the basis of the confidence value a specific number of positive tokens 222 and negative tokens 224 is generated. In particular, only positive tokens are generated when the confidence value is below the threshold value and only negative tokens are generated when the confidence value is above the threshold value. If the vehicle-side database 202 was not in the default mode or if no positive token was present, then no transfer of the event to the backend device would be performed and the on-board database 202 would be updated instead. The fact that positive and negative tokens were generated for the event, causes the vehicle-side database 202 to be transferred from the default mode to the event mode, in which only vehicles with a positive token are allowed to forward the event to the backend, while vehicles with a negative token are not allowed to forward the event to the backend. In the event mode it is also continuously examined whether the event has ceased to exist.

Figure 3:
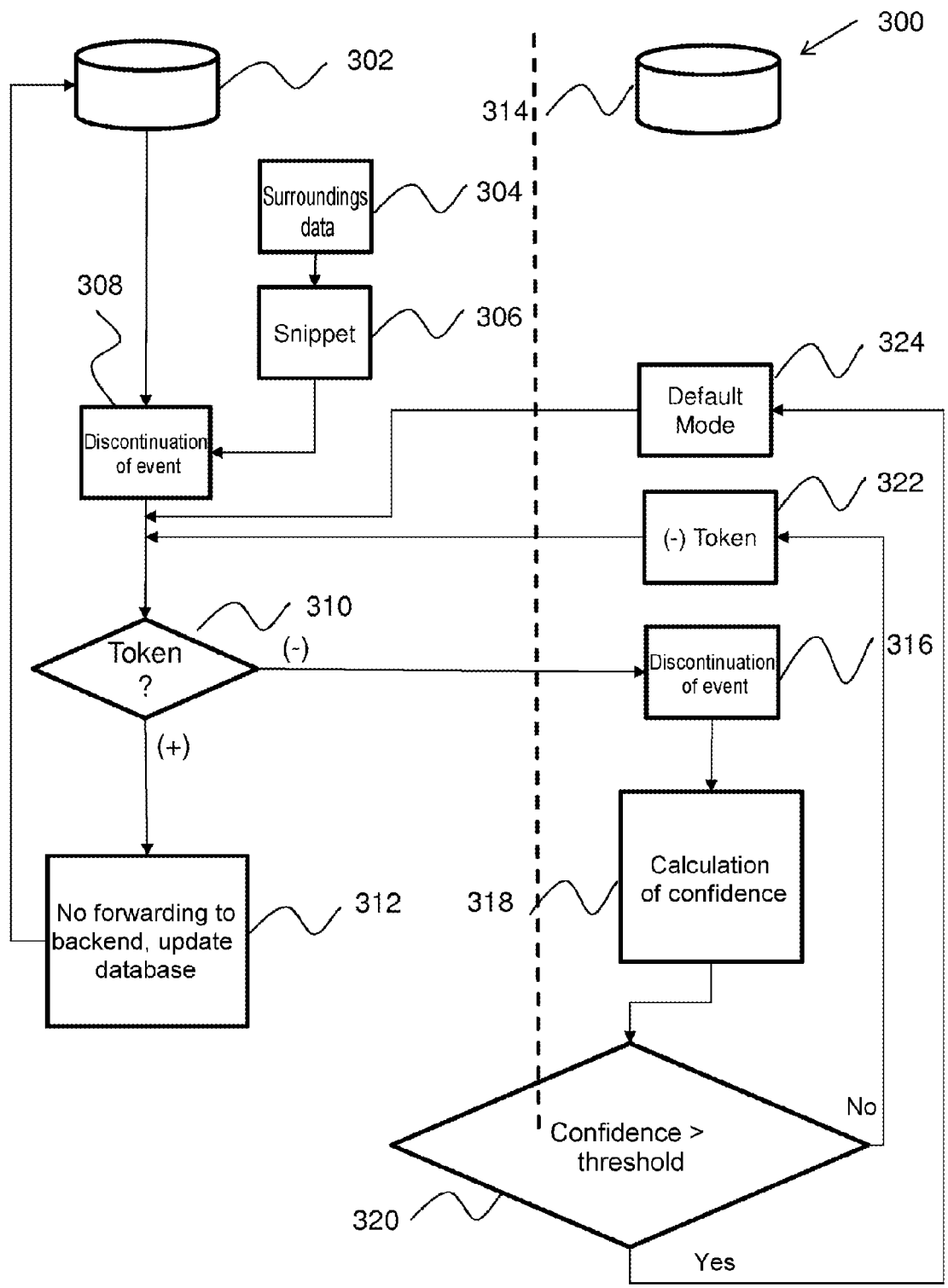
FIG. 3 a flow chart of the method for the discontinuation of the event.

A flow diagram of the protocol for the case of the discontinuation of the event is shown in FIG. 3. In the vehicle-side database 302 the event, i.e., the presence of the traffic sign 108 shown in FIG. 1, is stored in the form of object data. A vehicle-side sensor captures vehicle surroundings data, see step 304. From the vehicle surroundings data a snippet 306 is calculated by one or more vehicle-side processors. It is assumed that the snippet now no longer includes the traffic sign 108, see FIG. 1, for example, because it has been removed. By comparison, i.e. by calculating the difference between the objects in the vehicle-side database 302 and the snippet 306, the traffic sign 108 that is no longer present is identified as a discontinuation of the event, see step 308. In step 310, a check is made to determine whether a positive or negative token is present in relation to the event. If a positive token is present, then the discontinuation is not forwarded to the backend, but the vehicle-side database 302 is updated instead. On the other hand, if a negative token is present then the discontinuation of the event is communicated to the backend where it exists as a discontinuation of the event 316. At the backend side a confidence value for the discontinuation of the event is determined from the number of transfers of the event, possibly from different vehicles, and on the basis of the confidence value either a specific number of negative tokens 322 or a message which transfers the vehicle-side database 302 into the default mode is generated. In particular, only negative tokens are generated if the confidence value is below the threshold value. On the other hand, the message for the default mode is generated if the confidence value is above the threshold value, see step 320. This ensures that the vehicle-side database 302 is only transferred into the default mode in relation to the spatial position of the event when the discontinuation of the event is trustworthy due to a sufficiently high number of confirmations. The forwarding can be carried out using a broadcast. For this purpose, the spatial position of the event is mapped onto radio cells and messages are forwarded to the corresponding radio cell.

The invention claimed is:

1. A system for generating and/or updating a digital model of at least one sub region of a digital map,
said system comprising on a vehicle side:
a vehicle database with vehicle-side map data which image at least one sub-region of the digital map, one or more sensors for capturing vehicle surroundings data;
one or more processors, which are configured to
generate at least one snippet from the vehicle surroundings data; and
to determine from the snippet updating data of the sub-region of the digital map when an event occurs in the form of a difference between objects in the map data and objects in the snippet;

means for determining a spatial position of the event;
a vehicle-side transceiver, which is configured to receive a positive token or a negative token from a backend device and to forward said token to the vehicle database, and which is also configured to forward the updating data with the event and associated spatial position to the backend device when the vehicle-side database is in a default mode in relation to the spatial position of the event or when a positive token exists in a vehicle-side memory, during which default mode it is determined whether an event has come into existence; and the system having the backend device on a backend side, with:
a server database with backend-side map data of the digital model;
a backend-side transceiver which is configured to receive the updating data from one or more vehicles;
one or more processors, which are configured to statistically evaluate the updating data based on a number of transfers forwarding the updating data with the event and associated spatial position to the backend device, and to assign a confidence value to the updating data based on the number of transfers, and to perform an update of the backend-side map data depending on the statistical evaluation and to generate a certain number of positive and negative tokens depending on the statistical evaluation, wherein positive tokens are generated when the confidence value is below a threshold value, negative tokens are generated when the confidence value is above the threshold value, and the vehicle-side database transitions from the default mode to an event mode during which only vehicles with a positive token are allowed to forward the event to the backend device until a discontinuation of the event is identified on the vehicle side at which point the identified discontinuation of the event is communicated to the backend device only when a negative token is present on the vehicle side; and
wherein the backend-side transceiver is also configured to forward the positive or negative tokens to the one or more vehicles.

2. The system as claimed in claim 1, wherein the one or more processors of each vehicle are further configured to statistically evaluate the updating data, wherein depending on a quality of the updating data, a confidence value or a statistical parameter is assigned to said data, and wherein the vehicle-side transceiver of each vehicle is configured to forward the confidence value or the statistical parameter to the backend device as additional data in addition to the updating data.

3. The system as claimed in claim 2, wherein the one or more processors of the backend device are configured to statistically evaluate the updating data based on the number of vehicles that have forwarded the updating data and/or on the number of transfers, and to assign a confidence value to the updating data based on the number of vehicles and/or the transfers.

4. The system as claimed in claim 3, wherein the one or more processors of the backend device are configured to evaluate the updating data based on the number of vehicles which have forwarded the updating data, and/or on the number of transfers and on the basis of the additional data.

5. The system as claimed in claim 4, wherein the one or more processors of the backend device are configured to generate positive and negative tokens when the updating data have a statistical significance that exceeds a minimum threshold, wherein the positive and negative tokens are assigned at least the spatial position of the associated event and an event ID of the associated event; and wherein the transceiver of the backend device is configured to forward the positive and negative tokens to the one or more vehicles.

6. The system as claimed in claim 5, wherein the one or more vehicle-side processors are configured to detect a discontinuation of the event with a specific spatial position and assigned event ID when a negative difference exists between objects in the map data and objects in the snippet; and wherein the vehicle-side transceiver is configured to forward the discontinuation of the event in the form of updating data to the backend device when a negative token is present in the vehicle-side memory.

7. The system as claimed in claim 6, wherein the one or more processors of the backend device are configured to generate a message which will place the vehicle-side database in the default mode with respect to the spatial position and event ID of the event which event has ceased, when the updating data have a statistical significance that exceeds a minimum threshold value; and wherein the transceiver of the backend is configured to forward the message to the one or more vehicles.

8. The system as claimed in claim 6, wherein the one or more vehicle-side processors are configured to remove positive or negative tokens with respect to the spatial position and/or event ID from the vehicle-side memory.

9. The system as claimed in claim 8, wherein the backend-side transceiver is further configured to forward the positive or negative tokens to the one or more vehicles which are located within the spatial proximity of the event.

10. The system as claimed in claim 9, wherein the one or more backend-side processors are configured to update the server database with backend-side map data of the digital model with the updating data when the latter have a confidence value that exceeds a minimum threshold value, and wherein the backend-side transceiver is configured to forward at least the data from the updated database which relate to the event to vehicles which are located within the spatial proximity of the event.

* * * * *